Figure 1:
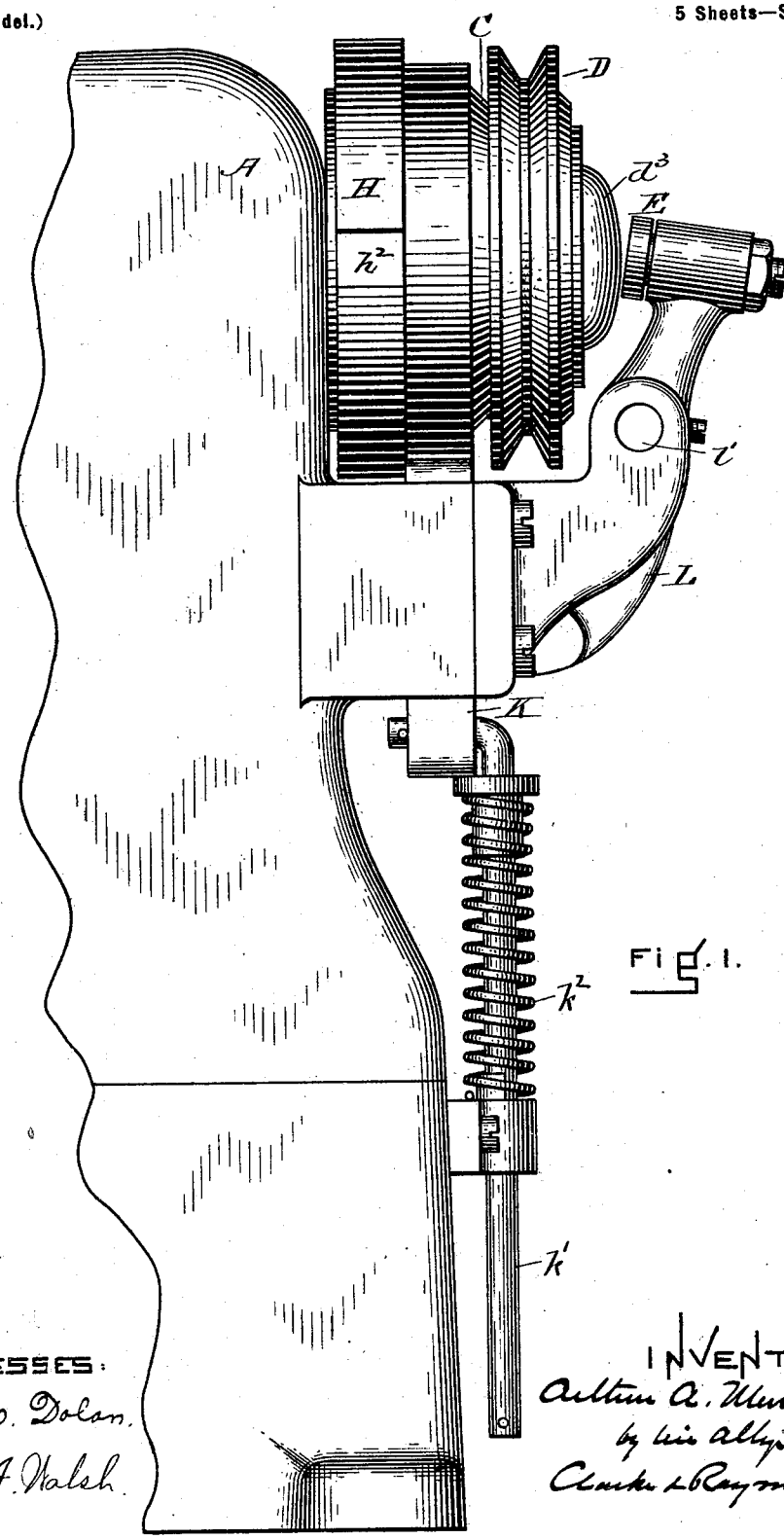

No. 630,298. Patented Aug. 1, 1899.
A. A. MERRITT.
START OR STOP MOTION MECHANISM.
(Application filed Feb. 12, 1897.)

(No Model.) 5 Sheets—Sheet 1.

Witnesses:
J. M. Dolan.
L. A. Walsh.

Inventor
Arthur A. Merritt
by his atty:
Clarke & Raymond

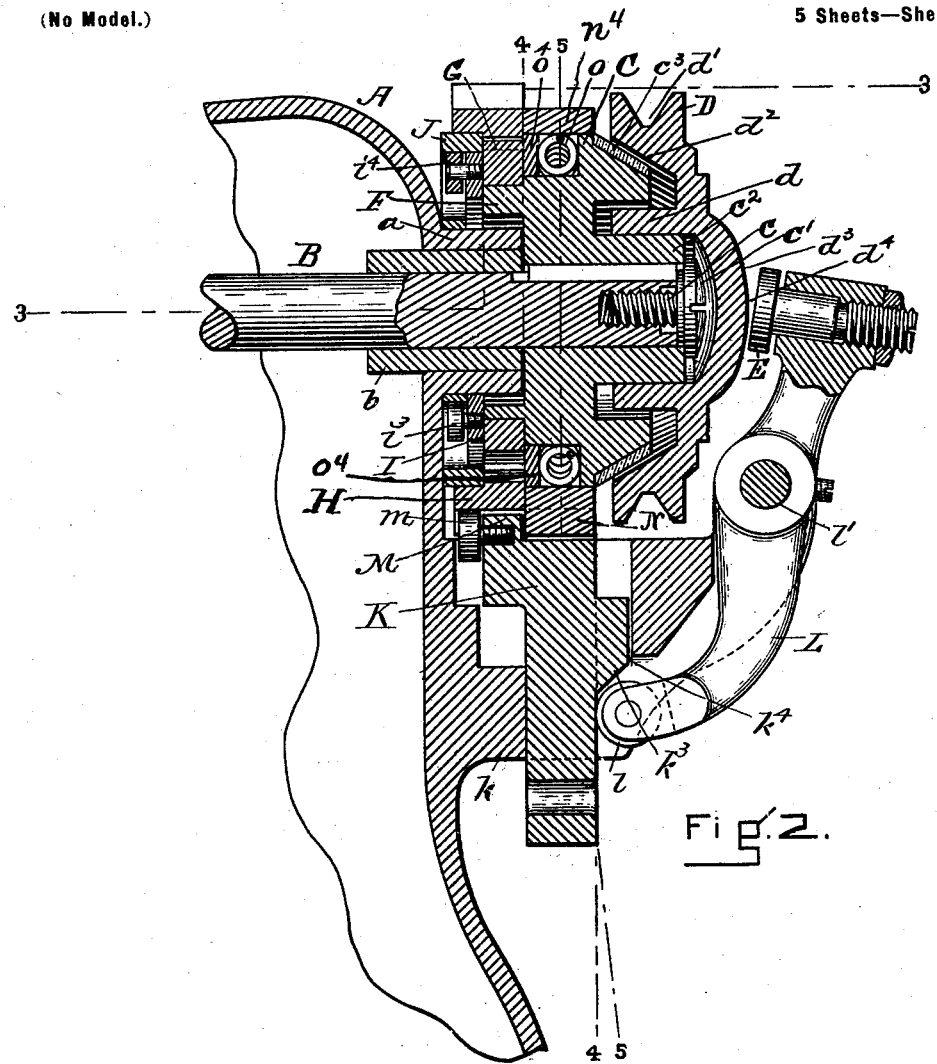

No. 630,298. Patented Aug. 1, 1899.
A. A. MERRITT.
START OR STOP MOTION MECHANISM.
(Application filed Feb. 12, 1897.)
(No Model.) 5 Sheets—Sheet 3.
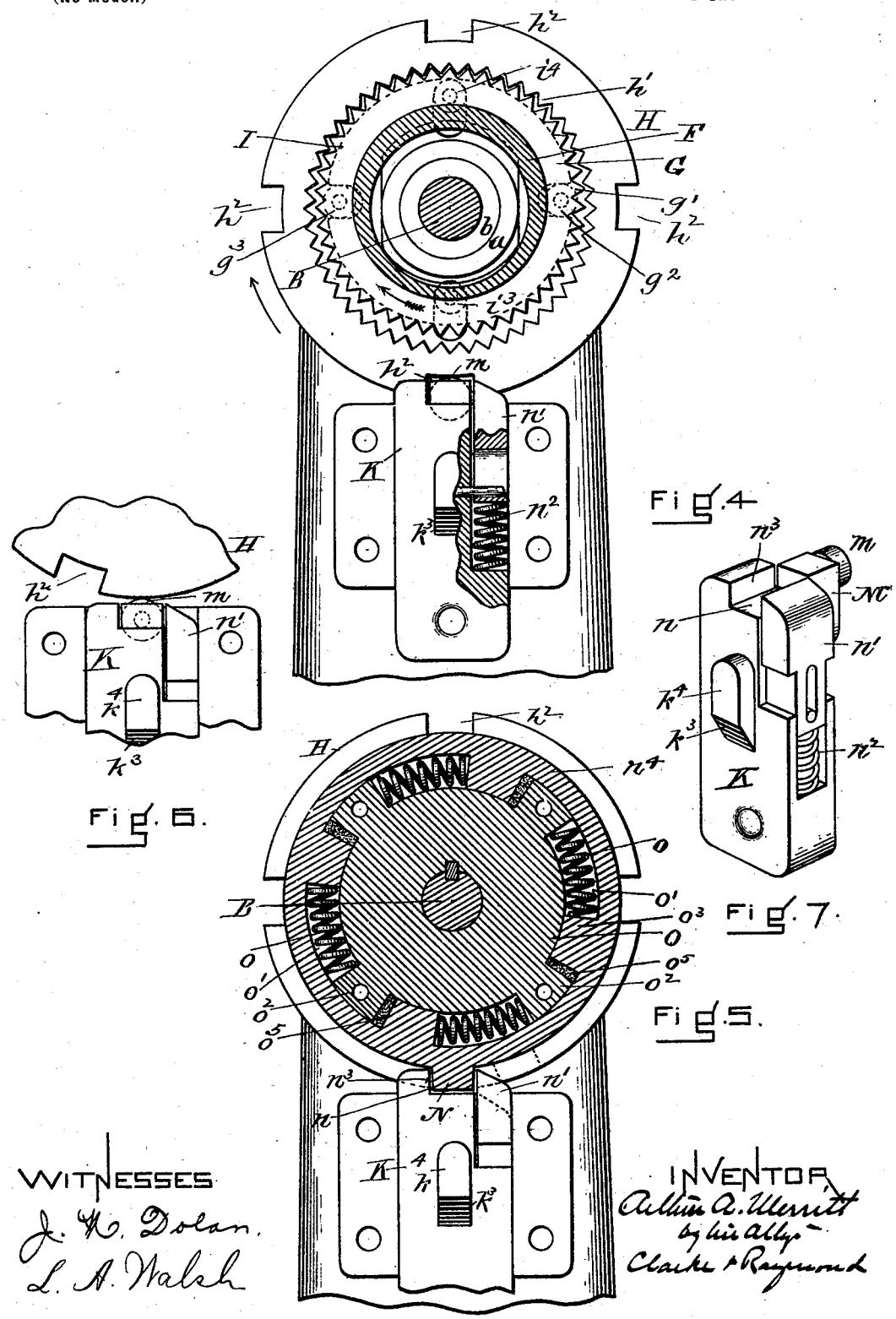

No. 630,298. Patented Aug. 1, 1899.
A. A. MERRITT.
START OR STOP MOTION MECHANISM.
(Application filed Feb. 12, 1897.)//
(No Model.) 5 Sheets—Sheet 4.
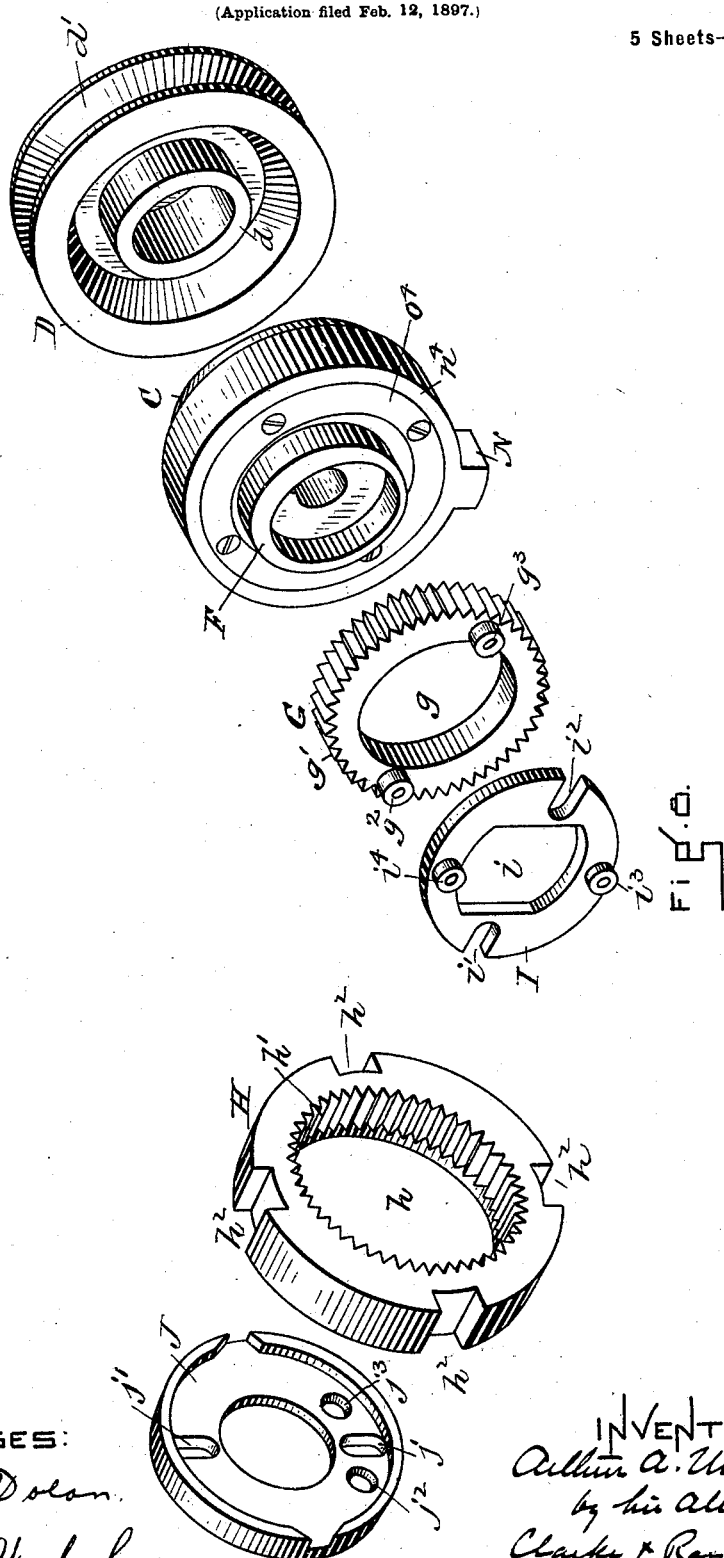
WITNESSES:
J. M. Dolan.
L. A. Walsh.
INVENTOR:
Arthur A. Merritt
by his Attys
Clarke & Raymond No. 630,298. Patented Aug. 1, 1899.
A. A. MERRITT.
START OR STOP MOTION MECHANISM.
(Application filed Feb. 12, 1897.)

(No Model.) 5 Sheets—Sheet 5.

UNITED STATES PATENT OFFICE.

ARTHUR A. MERRITT, OF COHOES, NEW YORK, ASSIGNOR, BY MESNE ASSIGN-MENTS, TO W. PIERREPONT WHITE, HUGH WHITE, AND CLARENCE B. CROUSE, OF UTICA, NEW YORK.

START OR STOP MOTION MECHANISM.

SPECIFICATION forming part of Letters Patent No. 630,298, dated August 1, 1899.

Application filed February 12, 1897. Serial No. 623,127. (No model.)

*To all whom it may concern:*

Be it known that I, ARTHUR A. MERRITT, a citizen of the United States, residing at Cohoes, in the county of Albany and State of New York, have invented a new and useful Improvement in Start or Stop Motion Mechanisms, of which the following is a full, clear, and exact description, reference being had to the accompanying drawings, forming a part of this specification, in explaining its nature.

The invention relates to a start and stop motion mechanism especially designed to automatically stop the operation of the machine upon the completion of any desired number of operations of the machine or of rotations of the main shaft thereof.

In the drawings the invention is represented as applied to the main shaft of a machine for sewing on buttons; but this is simply for the purposes of convenience.

Figure 9:
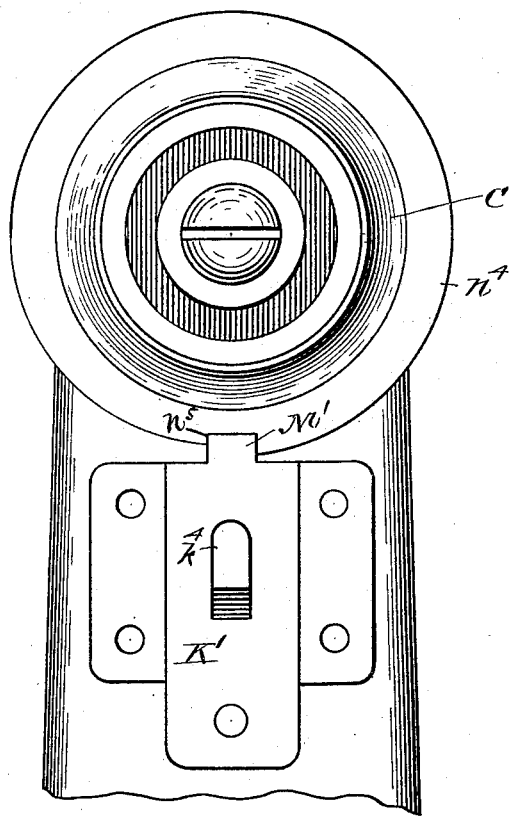
Figure 10:
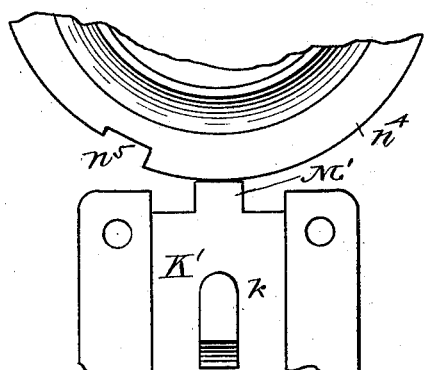
Figure 11:
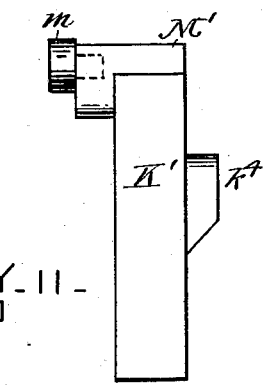

In the drawings, Figure 1 is a view in side elevation of the rear or back part of the frame of a stitching-machine having my improvement. Fig. 2 is a vertical central section thereof. Fig. 3 is a view in plan and horizontal section upon the dotted line 3 3 of Fig. 2. Fig. 4 is a view in vertical cross-section upon the dotted line 4 4 of Fig. 2. Fig. 5 is a view in vertical cross-section upon the dotted line 5 5 of Fig. 2. Fig. 6 is a detailed view representing the relation between the latch ring or wheel and the slide-block while the machine is in operation. Fig. 7 is a view in perspective of the slide-block, to which reference is hereinafter made. Fig. 8 is a view in perspective of various parts of the mechanism removed or separated from each other. Figs. 9, 10, and 11 are detail views representing a slight modification of the main-shaft-stopping mechanism as compared with that represented in Fig. 5.

In the drawings, A is the frame of the machine; B, the main shaft.

C is the driven member of a clutch keyed to the end of the shaft and also held thereon by the screw $c$, which screws into the end of the shaft and has a large head $c'$, which laps upon the end or hub $c^2$ of the said driven member of the clutch. The said driven member has the tapering surface $c^3$.

D is the driving-pulley and driving member of the clutch. It has a hub $d$, which is relatively long and which surrounds and bears upon the hub $c^2$ and is also movable endwise thereon. It has also in its edge the belt-recess $d'$ and in its inner face the beveled surface $d^2$, which is adapted to be closed upon the beveled surface $c^3$ of the driven member of the clutch in making an engagement between the driving and driven members. The pulley also has the continuous central section $d^3$, which covers the screw $c'$ and end of the shaft and provides a rounded exterior surface $d^4$, against which the pusher E is adapted to be moved and held in moving the driving member of the clutch into engagement with the driven member and in holding it in said engagement.

The frame A of the machine has an extension or hub $a$, through which the main shaft passes, a sleeve $b$ preferably being interposed. The outer end of this hub abuts against the inner face of the driven member C of the clutch. There extends from the inner face of the said driven member an eccentric sleeve F, which surrounds the hub $a$, but does not bear upon it. This eccentric sleeve communicates an eccentric movement to a disk G, which is represented as having the hole $g$. The disk surrounds the eccentric F and by it is given an eccentric movement within the cavity $h$ of the stop-wheel H. The disk G has its outer edge provided with teeth $g'$, which are preferably of triangular sections, as represented. The stop-wheel H has its internal surface formed into teeth $h'$, which are also preferably triangular in section. It also has a section that bears on the cap-plate J. The cavity $h$ of the stop-wheel is of sufficient size to permit the wheel G to describe an eccentric path therein, which brings all its teeth $g'$ in successive order and without rotating into engagement with the teeth $h'$ of the stop-wheel. (See Fig. 4.) There are not as many teeth upon the disk G as there are internal teeth upon the stop-wheel H. The disk G may have one less or any other desired number within manifest limits, and every time that it has been caused by its operating-eccentric to be moved in a circular path in the cavity $h$ without of course being rotated the stop-wheel H is moved the distance between the centers of the number of teeth it has in excess of the number of teeth upon the disk G. If it has but one more, then it is advanced the distance between the centers of two only. If it has two teeth more, then the distance between the centers of three. This provides the stop-wheel with a very slow rotation, and affords, by means of stop-recesses $h^2$ in its periphery or other equivalent means, points for determining the stopping of the machine by the disengagement of the driving-pulley from the driven, the said stop-wheel serving to maintain the two clutches in engagement until the position of the stopping-recess $h^2$ permits the operation of mechanism which will remove the driving-clutch from the driven. The wheel H may have as many stopping-recesses as may be desired. I prefer that the movement of the disk G be in part governed by the slide-plate I. This has a slot $i$, through which the hub $a$ extends. It has long slots $i'$ $i^2$, extending inward from its outer edge, which receive the pins $g^2$ $g^3$, extending from one face of the disk G. The slide-plate also has the pins $i^3$ $i^4$, which enter the slots $j j'$ in the cap-plate J, which is fastened to the frame of the machine by screws passing through the holes $j^2$ $j^3$. This slide-plate, by means of the said stationary slots $j j'$ and its pins $i^3$ $i^4$ and by means of its recesses $i'$ $i^2$ and the disk-pins $g^2$ $g^3$, steadies the eccentric movement of the disk G and prevents it from revolving. I do not wish to limit the invention to this construction of plate for preventing the rotation of the disk G, as I can use any mechanical equivalent for it.

The machine has a slide K, vertically movable in the bracket $k$ by a lever or treadle connected with it by a rod $k'$. The slide is moved downward in opposition to the spring $k^2$, which acts to move it upward upon its release and when a latch-recess $h^2$ comes into engaging position therewith. The slide has a wedge-face $k^3$, which upon its downward movement is brought into engagement with the roll $i$ at the lower end of the lever L, which is pivoted at $l'$. This lever has at its upper end the pusher E, and the wedge serves to move the pusher against the pulley and driving member of the clutch to move it inward against the driven member, and the flat face $k^4$ of the wedge serves to hold the lever in this last-named position and with the pusher in engagement with the pulley, and so long as the wedge-block occupies this position the members of the clutch are in engagement and the driven member and the main shaft are being turned as well as the stop-wheel. It is not always necessary, however, to use the flat face $k^4$, as the wedge-face $k^3$ is with some forms of construction found to be sufficient.

The downward movement of the block K to operate the lever simultaneously moves the latch M from one of the recesses $h^2$ of the stop-wheel and locking-recess $n$ from the lock N, and as the machine immediately starts the stop-wheel begins to turn, closing behind the end of the latch M, which preferably has a roll adapted to bear upon the periphery of the stop-wheel when the operating lever or treadle has been released. (See Fig. 6.) When the stop-wheel has been turned to bring the next recess $h^2$ in order into line with the latch M, the latch M is moved into it by the action of the spring $k^2$ upon the slide-block K, and this also causes the wedge-block to be removed from behind the lever and the pusher E from contact with the pulley, and thereby effects a disengagement of the driving member of the clutch from the driven member. The locking-recess $n$ is also in the slide-block K, and it is upon the upward movement of said slide brought into position to receive the lock N upon the ring $n^4$, surrounding the driven member C of the clutch, the said lock pressing downward the latch $n'$, which is carried by the slide-block K and which is moved upward by the spring $n^2$ after the lock has passed it to hold the lock, and therefore the driven member of the clutch, from moving or rebounding backward, the lock passing by the latch comes into contact with the stop $n^3$, which forms one wall of the locking-recess. The lock N is attached to the ring $n^4$ rather than directly to the driven member of the clutch in order to provide for the interposition of a buffer O between the lock and the driven member of the clutch.

It will be understood that the buffer is obtained by giving the ring a limited movement upon the driven member in opposition to one or more springs $o$, preferably contained in the recesses $o'$ in the periphery of the driven member and bearing against abutments $o^2$, integral with the driven member, and also against inward extensions $o^3$ of the ring. A plate $o^4$, fastened by screws to the abutments $o^2$, serves to keep the springs and ring in place. Non-resilient buffers $o^5$ may be placed between the abutments $o^2$ and the inward extensions $o^3$ upon the sides opposite the springs. It will be seen that if the machine is under momentum when the lock-recess $n$ engages the stop N and the ring $n^4$ is immediately stopped the machine and driven member of the clutch are not immediately stopped with a dead shock, but come up against the spring-buffer.

The operation of the device is as follows: The slide K is moved downward. This causes the lever to move the pulley and driving member of the clutch into engagement with the driven member of the clutch and the machine is immediately set in operation. The slide K is latched down by the immediate movement of the latch ring or wheel over it and the downward movement of the slide also releases the driven clutch-lock. The latch ring or wheel continues to be gradually turned in one direction and the operation of the machine continues until a latching-recess in the latch-wheel comes into line with the latch of the slide K. The slide is then forced upward by the spring $k^2$ and carries the wedge-block $k^3$ away from the lower end of the lever L. The pusher E is no longer pressed against the end of the driving member of the clutch and the driven member is thereby disengaged from it. The locking-recess in the slide K is also brought into connection with the ring $n^4$ on the driven member of the clutch and stops the revolution thereof.

While I prefer that the teeth of the disk and latch-wheel have the wedge shape shown and described, I do not confine myself to such shape.

It will be seen that at all times in the movement of the disk G a number of its teeth are in engagement with the teeth of the latch-wheel, thereby insuring a very strong connection between the two.

In Figs. 9, 10, and 11 I show the mechanical equivalent for the devices for stopping the rotation of the shaft upon the automatic disengagement of the driving member of the clutch from the driven member, the slide-block K' in said construction having a projection M', which is the equivalent of the stop N, extending from its upper edge and which is adapted to enter a stop-space $n^5$, milled across the edge of the ring $n^4$, and when this space by the rotation of the ring is brought into line with the stop the stop enters the same and stops the ring from further rotation and through it the shaft. The ring may be extended upon the side which comes into contact with the side of the stop, as shown in the drawings.

It will be understood that the spring acting against the block K moves the stop into the stop-recess when the recess comes into line therewith.

Having thus fully described my invention, I claim and desire to secure by Letters Patent of the United States—

1. In a start and stop motion mechanism, the combination of a driving member of a clutch, a driven member, a latch-wheel supported independently of said driven member having an internal gear, a toothed disk connected with the driven member of the clutch the teeth of which mesh in the manner described with the teeth of the latch-wheel, and whereby the latch-wheel is caused to be rotated, and a latch, as and for the purposes specified.

2. In a start and stop motion mechanism, the combination of a driving member of a clutch, a driven member, a latch-wheel supported independently of said driven member and having an internal gear, a toothed disk connected with the driven member of the clutch the teeth of which mesh in the manner described with the teeth of the latch-wheel, and to cause the same to be rotated, a movable block, the movement of which is controlled by said latch-wheel, and devices connecting it with the driving member of the clutch, as and for the purposes described.

3. In a start and stop motion mechanism the combination of a driving member of a clutch, a driven member, a latch-wheel H supported independently of said driven member having the internal gear $h'$, the disk G having engaging teeth $g'$ and eccentrically moved without being rotated on its axis in the cavity of the latch-wheel H, whereby its teeth are caused to make engagement with the internal teeth of said latch-wheel, a movable block K, connected with the clutch to operate the same, and having a stop or holder to receive and hold a stop on the driven clutch or other part of the machine upon the disengagement of the two members of the clutch, as and for the purposes described.

4. The combination of the latch-wheel supported independently of the clutch mechanism, the movable block K comprising a latch and a holder, the movements of which are controlled by said latch-wheel, the clutch mechanism actuated by said movable block, a stop connected with the main shaft of the machine to engage said holder and a buffer interposed between said stop and the main shaft of the machine, as and for the purposes specified.

5. The combination in a mechanism of the character specified of a main shaft, a driven member of a clutch secured thereto, a driving member of a clutch which may be a loose pulley movable toward and from the driven member of the clutch, an eccentric upon the inner face of the driven member of the clutch, a disk surrounding said eccentric operated thereby and having the teeth $g'$, a notched ring or wheel H having the internal teeth $h'$ and a bearing which extends upon the outer surface of the cap J, the teeth of the disk G making engagement with the teeth of the notched ring or wheel as specified, the slide K having the incline $k^3$ and rest $k^4$, the projection M and the holder and stop $n'$, $n^3$, the lever L pivoted as described, a pusher E at one end adapted to be moved by the lever against the driving member of the clutch, the lever being adapted to be moved and held by the incline and rest $k^4$ and a ring upon the driven member of the clutch having a limited movement thereon in opposition to one or more springs provided with a stop or projection, a spring $k^2$ to act against the block K and a rod $k'$ or other device to draw the block away from the latch-ring, as and for the purposes described.

6. The combination in a device of the character specified of the eccentric F, the disk G having the teeth $g'$ upon its outer edge adapted to be moved by the eccentric, a wheel having the teeth $h'$ and a compound slide connecting the ring or disk G with the plate J comprising the plate I connected with the plate J to be movable in one direction in relation thereto and connected with the said disk G to permit it to be moved at right angles to its own movement thereon, as and for the purposes described.

7. The combination of a wheel or driven member of a clutch having the extensions $o^2$, with a ring having the inward extensions $o^3$, the springs $o'$, the cap-plate $o^4$ and the stop N, all as and for the purposes described.

ARTHUR A. MERRITT.

In presence of—
M. A. METCALF,
HUGH WHITE.